United States Patent [19]

Vorbach et al.

[11] 3,979,036
[45] Sept. 7, 1976

[54] PAPER GUIDE FOR TAPE PERFORATORS WITH AN AUTOMATIC PITCH-ADAPTED THREADING MECHANISM FOR THE FEED ELEMENT ZONE

[75] Inventors: Guenther Vorbach, Schwindega; Wolfgang Peter Mueller, Munich, both of Germany

[73] Assignee: Siemens Aktiengesellschaft, Berlin & Munich, Germany

[22] Filed: Aug. 29, 1975

[21] Appl. No.: 608,891

[30] Foreign Application Priority Data

Sept. 20, 1974  Germany............................ 2445060

[52] U.S. Cl.................................. 226/83; 226/47; 226/89; 352/157
[51] Int. Cl.².................. G03B 1/24; B65H 25/00
[58] Field of Search ................. 226/91, 83, 89, 92, 226/56, 47; 352/157

[56] References Cited
UNITED STATES PATENTS

| | | |
|---|---|---|
| 3,146,928 | 9/1964 | Hagstrom............................ 226/83 |
| 3,656,602 | 4/1972 | Konkel et al. ..................... 226/83 X |

Primary Examiner—Evon C. Blunk
Assistant Examiner—Bruce H. Stoner, Jr.
Attorney, Agent, or Firm—Hill, Gross, Simpson, Van Santen, Steadman, Chiara & Simpson

[57] ABSTRACT

A guiding and threading device for automatic pitch-adapted threading of data carriers such as punched tape. The device includes a base member having a tape support surface thereon, a feed wheel carried by the base member with a portion projecting above the support surface, a first pivotable member carried by the base member having a guiding surface positioned above the support surface and a second pivotable member opposed to the first pivotable member and having a guiding surface positioned above the support surface, the guide surfaces forming a tape receiving channel between the pivotable members and the support surface when the pivotable members are at an open position. The guide surface of the first pivotable member urges the tape into contact with the feed wheel when in a closed position. The second pivotable member is when the with means engaging the first pivotable member limiting movement of the first pivotable member with respect to the second pivotable member to provide a substantially continuous guide surface whenthe pivotable members are in the open position.

11 Claims, 2 Drawing Figures

PAPER GUIDE FOR TAPE PERFORATORS WITH AN AUTOMATIC PITCH-ADAPTED THREADING MECHANISM FOR THE FEED ELEMENT ZONE

BACKGROUND OF THE INVENTION

1. Field of the Invention

This invention relates to punched tape feeding and guiding mechanisms and more particularly to a threading and guiding mechanism to be used in the area of the feed element.

2. Prior Art

The present invention is directed to a mechanism which will provide for automatic, pitch-adapted threading and guiding of a data carrier, such as a punched tape. The mechanism is to be used in the neighborhood of the feed and scanner elements of a perforator punch assembly such as is used to produce the perforations in the punched tape.

Punched tape perforators are known to the art. Many such perforators, particularly those used in association with teletypewriters or teleprinters, are associated with a source of tape, generally an unperforated paper tape wound on a supply wheel. The tape is incrementally drawn, step by step by feed elements through a perforator punch assembly which will perforate the tape in accordance with information supplied to the punch assembly. In order to allow the perforated tape to be read without error, the individual perforations or perforation rows, must be spaced apart at predetermined intervals. That is to say, the "tape pitch" must be properly maintained.

To adjust the tape pitch it has been known to utilize the interval between the punch assembly and a tape driving feed wheel as a control condition. Therefore, for correct guidance of the punched tape, it is necessary to provide punched tape guide tracks on which the tape is guided and which prevent horizontal and vertical displacement and twisting of the tape. When this is accomplished properly, the tape pitch will be maintained constant.

In order to fulfill these requirements, the prior known punched tape guides have been of such designs which, when effective to properly guide the tape, required relatively complicated procedures to thread the unperforated tape prior to perforating operations. In addition, it has been common in prior art designs to require the use of adjusting devices, such as adjusting screws etc., to specifically align and adjust the tape.

Therefore, during both the threading and the adjusting operations, no perforating operations can be carried out. This presents a time delay. It is desired to be able to maintain the threading time as short as possible while utilizing a punched tape guide and threading mechanism which is simple to operate while being effective to maintain proper tape pitch.

SUMMARY OF THE INVENTION

It is therefore a primary object of this invention to provide a mechanism for pitch-adapted automatic threading and guidance of data carriers, in particularly punched tape data carriers. Additionally our invention provides a mechanism which can be manufactured and assembled relatively inexpensively and with which the insertion of the unperforated tape will be easily accomplished while assuring that pitch-adapted tape feed is reliably achieved. Furthermore our invention provides a mechanism in which the functional parts are readily accessible for cleaning without the use of tools.

The invention provides a guide track or base member with interlocking retainers which are pivotably assembled thereon and which combine to provided a defined channel for the tape. The retainers consist of a pivoting component and a locking component which has guide ribs formed thereon. Additionally, within the field of pivot of one of the retainers, an electrical sensing device is positioned which is coupled to the feed element drive in such a fashion that when the retainers are closed, they will both press the tape into contact with the feed element and activate the feed element to move the tape or other data carrier a specific number of pitches or incremental advances.

In a particularly advantageous embodiment, as illustrated herein, in order to feed the unperforated tape into the mechanism, the locking component and the pivoting component combine to define a slide track for the tape. The slide track is spaced from both a support surface of the guide track or base member and from the feed element when the retainers are in a tape feed position. In the illustrated construction, the locking component includes guide ribs which are indexed within the pivoting component and which have bottom surfaces which form the locking component portion of the slide track. The pivoting component is urged to the tape feed position by a spring element and is locked in the feed or closed position by a releasable latch.

A major advantage of the invention is that it simplifies the insertion of the unperforated tape into the guide mechanism prior to the commencement of perforating operations. After the tape has been placed in the guide track with the retainers in the tape insertion position, by the simple act of closing the pivoting component, the unperforated tape will be pressed into position over the feed element, which may be a pinned wheel. At the same time the pivoting of the pivoting component will actuate a contact which triggers the feed operation. Actuation of the feed operation engages the feed or pin wheel which draws the unperforated tape entrapped between the pivotable retainers and the wheel, through the mechanism until the first perforations are in position above the pin wheel. Because of the inherent elasticity of punched tape and the design of the guide track, the perforated holes will be automatically centered on the pins and after about 50 feed cycles or incremental advances, the perforated tape will have automatically threaded itself in accurately pitched fashion. At this point, the actual threading operation will have been completed and the mechanism then automatically disconnects itself.

The complete device is quite robust and reliable and can be manufactured simply and inexpensively, as by means of use of injection-molding techniques.

Because the individual components of the mechanism are attached together simply, as by means of snap connectors, the complete mechanism can be easily dismantled for cleaning purposes when necessary.

In the preferred embodiment, the guide track is equipped with flanges and the spindle of the feed wheel is attached to the flanges by means of snap connectors. In this manner the complete guiding and threading device is combined with the feed wheel. This combination achieves particularly accurate guidance of the data carrier.

It is therefore an object of this invention to provide an improved threading and guiding device for punched tape.

It is a more particular object of this invention to provide a threading and guiding device for punched tape which includes a guide track base member to which is attached a feed wheel having a portion projecting above a support surface of the guide track, the guide track also carries pivotably attached retainer members which are openable to a tape in-feed position and which define a channel between tape guide surfaces of the retainers and the support surface of the guide track and which are closable to an operating position to urge the tape into contact with the feed wheel.

It is yet another and more specific object of this invention to provide a punched tape threading and guiding mechanism consisting of a base member having attached thereto opposed pivotable retainers having portions extending above a support surface on the base and defining with portions of the support surface a threading channel for a punched tape when in an open position, the retainers being pivotable to a closed position to urge the tape into contact with a feed wheel also carried by the base which has a portion projecting above the support surface, closure of the retainers automatically actuating the feed wheel to advance the tape a predetermined number of increments through the device.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
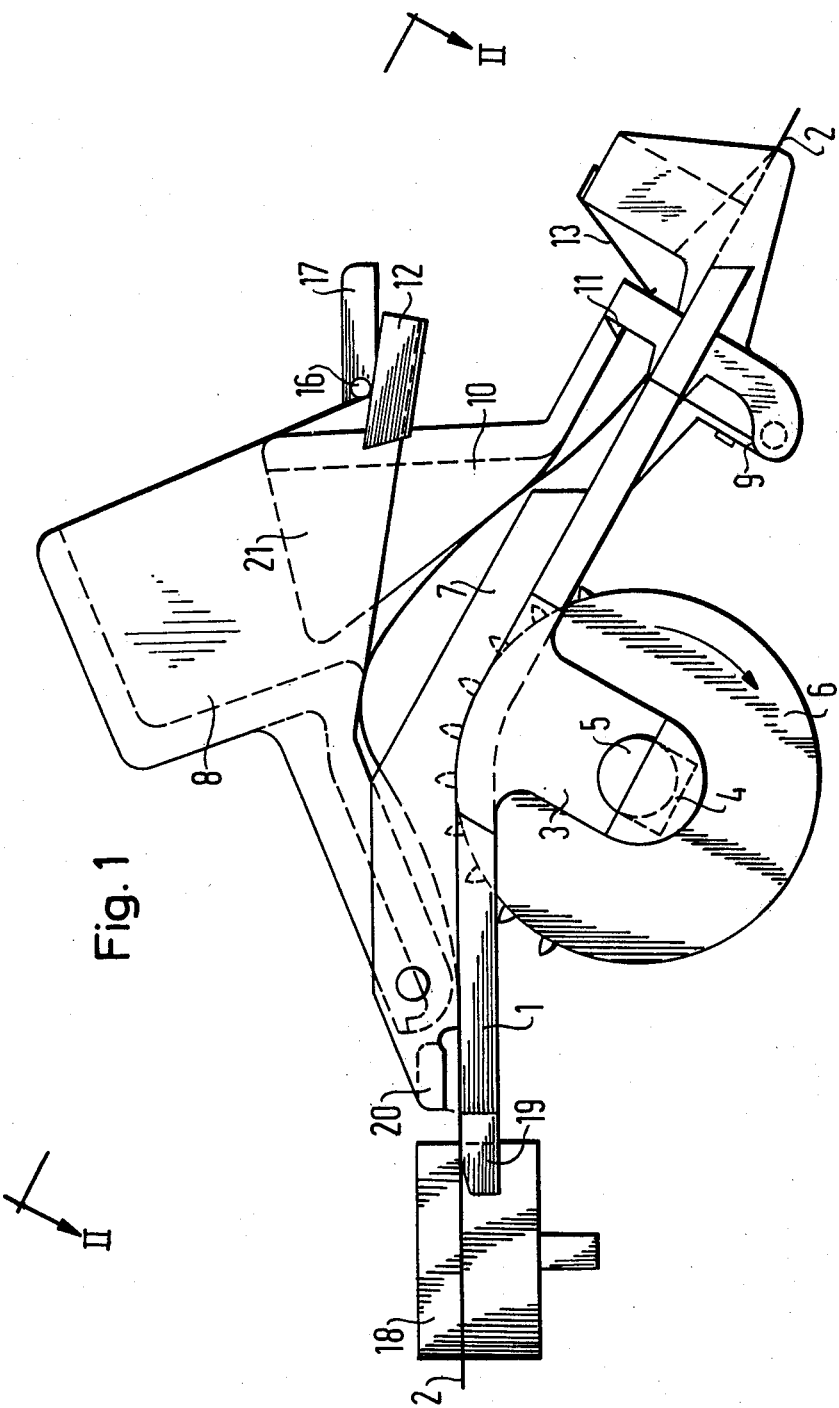
FIG. 1 is a side elevational view of a punched tape threading and guiding device according to this invention.
Figure 2:
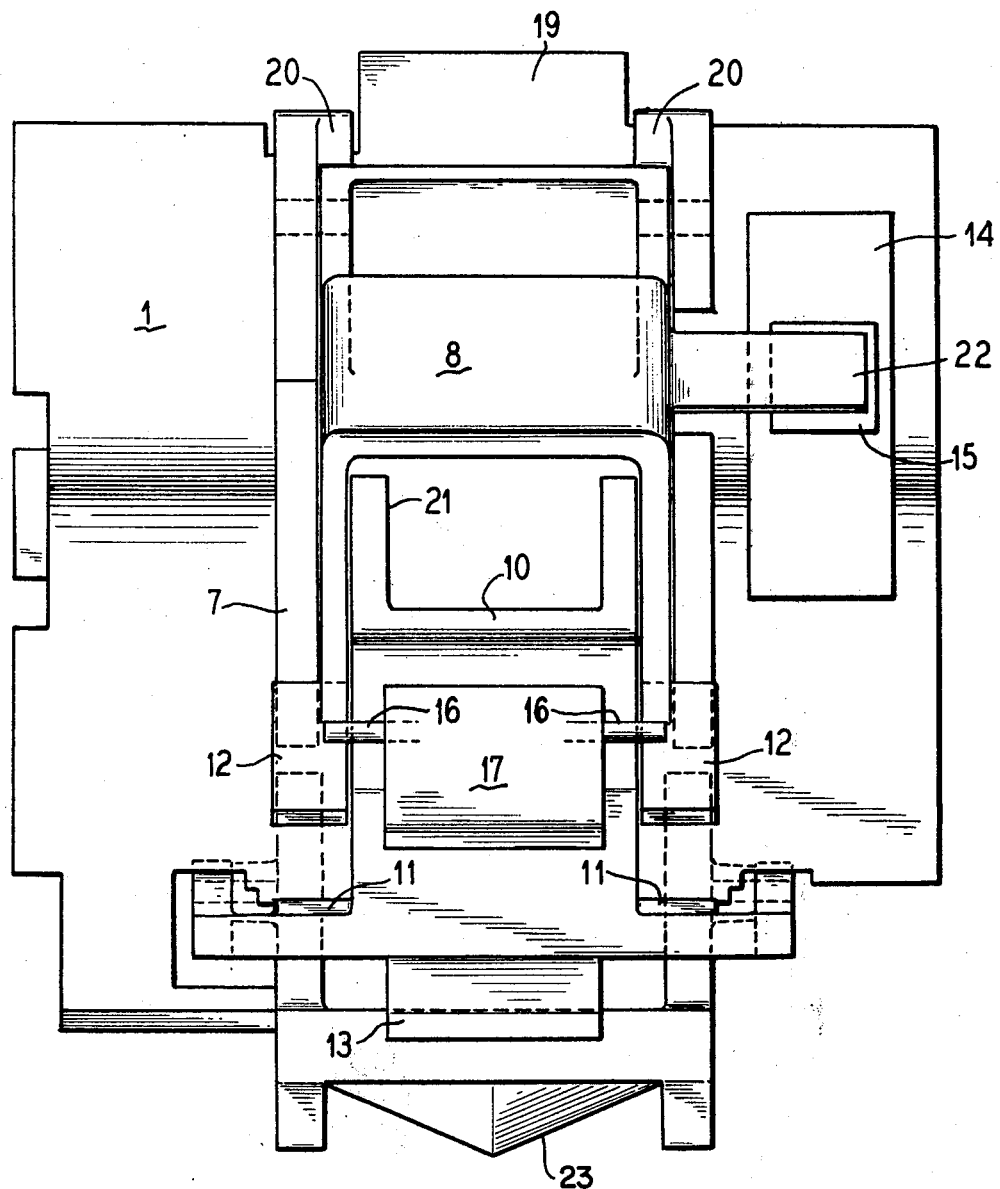
FIG. 2 is a plan view of the device of FIG. 1 taken along the line II—II.

FIG. 1 illustrates a threading and guiding mechanism which consists of a base member or guide track 1 having a support surface which is designed to receive a data carrier such as a punched tape 2. Flanges 3 which may be formed as a part of the guide track 1 depend from the track and receive the spindle 5 of a pin wheel 6 which functions as a feed element. The spindle may be attached through detent elements 4, preferably of a snap variety. The flanges 3 center the guide track 1 with respect to the pin wheel 6. By centering the guide track all other elements of the device are effectively centered with respect to the pin wheel in as much as they are attached to the guide track element.

The guide track 1 is equipped with lateral upstanding guides 7 which project above the top or support surface of the guide track. A first retainer consisting of a pivoting component 8 is attached to the guide track through a pivotable connection with the lateral guides 7 disposed on either side of the support surface. A second retainer consisting of a locking component 10 is pivotably attached to the guide track through flanges 9 which depend from the guide track. The first and second retainers engage with one another to form a complete retainer arrangement vis-a-vis the guide track.

FIG. 1 illustrates the first and second retainers in an open tape inserting position. The retainers can also be closed with the pivoting component 8 being held in a closed position by engagement with detent pawls 11 formed as projections on the locking component 10 and engaging with locking extensions 12 on the pivoting component 8.

The locking component 10 is biased by a first spring element 13 into contact with the pivoting component 8. With the locking arrangement open, in the tape insertion position shown in FIG. 1, the pivoting component 8 pivots under the action of a second spring element 15 associated with a microswitch 14 into the position of FIG. 1 where it is engaged by retainer dogs 16 attached to a finger grip 17 formed on the locking component 10. This will prevent the pivoting component 8 from fully pivoting outwardly and therefore allows the undersurface of the pivoting component, which is formed substantially as illustrated in FIG. 1 to function as a guiding surface for the tape being inserted.

The locking component 10 is formed with guide ribs 21 which have undersurfaces which cooperate with the undersurface of the pivoting component 8 to form a slide track or guiding surface which is spaced from the support surface of the guide track 1 and from the pin wheel 6 when the retainers are in the open position. By this construction, the guide surfaces form a substantially continuous slide track which allows the tape to feed unhindered through the mechanism in accordance with the invention.

Accurate placement of the threading and guiding device with a punch unit, as illustrated at 18, is achieved by means of a tongue-like extension element 19 on the guide track 1. The guide track 1 engages with the punch unit 18 through the use of the tongue-like element 19. Adjacent to the tongue 19, dog-type extensions 20 extending from the lateral guides 7 and projecting over the support surface of the guide track, are provided. These extensions aid in maintaining proper alignment of the tape by preventing unwanted jamming or lifting of the punched tape at the point of attachment to the punch unit 18.

Before the disclosed mechanism is actuated, the unperforated tape is drawn off from a supply wheel (not shown) and inserted through the mechanism with the retainer swung back to the tape in-feed position. After the tape has been inserted through the mechanism, the actual threading operation is initiated by closing the pivoting component 8. An extension 22 on the pivoting component which may be acted on by the spring 15 will activate a microswitch 14 which is connected to the drive mechanism (not shown) of the pin wheel 6. The pin wheel will then be rotated to draw the punched tape a predetermined number of perforations or increments through the mechanism in accordance with the invention. It has been found that advancement of approximately 50 increments is satisfactory. During this feed movement, the holes perforated in the punched tape by the punch unit 18 reach the pin wheel and thread onto the pin wheel in an accurately pitched manner. This then completes the threading operation and the mechanism automatically disconnects itself.

It will be understood that closure of the pivoting component 8 will urge the tape into proper contact with the pin wheel 6 and maintain it therein. After completion of the perforating operation, the complete punched tape can be torn of at an edge 23 provided for this purpose.

The entire mechanism is extremely cheap to manufacture, for example, by means of injection-molding. Because the guide track 1 or base member is directly centered on the pin wheel, extremely accurate guidance of the punched tape 2 is achieved. When it is desired to clean the unit, the pivoting component 8 can be quite simply pushed beyond the retaining member 16 by reverse movement of the pivoting component 8 and the locking component 10. Thereafter the pivoting component 8 can be completely moved out of the way giving access to the interior of the mechanism. In the preferred embodiment, all bearings and flanges will be designed as snap connector elements thereby allowing case of assembly and, if necessary, disassembly.

We claim as our invention

1. A mechanism for automatic pitch-adapted threading and guiding of data carriers adjacent the feed and scanner elements of perforating punches comprising: a guide track having interlocking retainers pivotably connected thereto including a pivoting component and a locking component, the guide track having fixed flange means formed therewith, a shaft of a rotatable feed element received in said flange means whereby the feed element is carried by said guide track, the retainers pivotable through an arc, an electrical sensing device associated with said guide track, a portion of at least one of said retainers contacting the electrical sensing device during movement through its arc to actuate the sensing device, the sensing device operatively coupled with the feed element whereby actuation of the sensing device causes rotation of the feed element, and at least one of the retainers positioned with respect to the feed element to urge a data carrier positioned on the guide track above the feed element into contact with the feed element during pivoting of the at least one of the retainers to a closed, electrical sensing device actuating position.

2. The mechanism of claim 1 wherein the retainers are movable between a closed electrical sensing device actuating position and an open data carrier in-feed position, the retainers having guiding surfaces associated therewith opposed to a data carrier support surface on the guide track, the guiding surfaces being spaced from the support surface and feed element when in the open position and the guiding surfaces forming a slide track spaced from the feed element when in the open position allowing insertion of a data carrier through the mechanism intermediate the guiding and support surfaces.

3. A mechanism according to claim 2 wherein a spring member carried by the guide track urges the locking component into contact with the pivoting component.

4. The mechanism of claim 3 wherein the locking component has abutting means formed thereon which project into the arcuate path of the pivoting component and are effective to engage the pivoting component which is spring urged away from the guide track and to maintain it in the open position properly spaced from the support surface and feed element.

5. Mechanism according to claim 4 wherein locking means resiliently carried by the guide track engage portions of the pivoting component when in the closed position and are effective to maintain the pivoting component in the closed position.

6. Mechanism according to claim 5 wherein the guide track is equipped with lateral guide walls for guiding the data carrier in position over the support surface, and the guide track has dog-type extensions projecting inwardly from the lateral guides adjacent one end of the guide track, the extensions spaced from the support surface.

7. A device for guiding and threading punched tape comprising: a guide track member with a tape support surface, a pivoting member pivotally attached to the guide track and having a portion thereof overlying a portion of the support surface, a feed wheel carried by the guide track and having a portion projecting above the support surface, a locking component pivotably carried by the guide track and having a portion thereof overlying a portion of the support surface, the pivoting member and the locking component having tape guiding surfaces opposed to the support surface, open end means for inserting a tape between the guiding surfaces and the support surface, the pivoting member pivotable to a closed position urging the tape into contact with the feed wheel, abutting portions of the locking component engagable with the pivoting member restricting independent movement of the pivoting member with respect to the locking component when they are in an open tape insertion position to properly align the guiding surfaces, and releasable locking means operably affixed to the guide track engagable with the pivoting member to retain it in the closed position.

8. The device of claim 7 including means on the pivoting member engaging an actuator to rotate the feed wheel upon movement of the pivoting member from the open position to the closed position.

9. The device of claim 8 wherein the pivoting member and the locking component are pivotably attached to the guide track on opposite sides of the feed wheel and are pivotable towards and away from one another.

10. A device for guiding and feeding punched tape comprising: a guide track having a punched tape support surface thereon, flange means depending from said guide track, a feed wheel rotatably carried by said flange means having a portion thereof projecting above the said support surface in the area of the said support surface, a first pivotable member pivotably attached to the feed track having a portion positioned above the said support surface, the first pivotable member having a first guide surface opposed to the said support surface, a second pivotable member pivotably attached to the said guide track having a portion thereof positioned above the said support with a second guide surface opposed to the said support surface, the said first pivotable member having a portion overlying the feed wheel, the said pivotable members pivotable towards and away from one another between an open punched tape feeding position with the guide surfaces spaced from the support surface and the feed wheel and a closed position, the guide surface of the first pivotable member urging a punched tape positioned atop the support surface into engagement with the feed wheel when in the closed position, releasable latch means retaining the first pivotable member in the closed position, abutment means carried by the second pivotable member engaging the first pivotable member in the open position restricting movement of the first pivotable member away from the second pivotable member with the guide surfaces aligned to guide a tape through the device between the guide surfaces and the support surface, first spring means urging the first pivotable member away from the guide track, second spring means urging the second pivotable member towards the first pivotable member.

11. The device of claim 10 wherein actuating means are provided in association with the guide track, the first pivotable member having a projection engaging the actuating means upon movement of the first pivotable member to the closed position from the open position, the actuating means effective to cause rotation of the feed wheel when engaged by the first pivotable member.

* * * * *